Oct. 28, 1958  F. A. NELSON  2,858,504
MEANS AND APPARATUS FOR IMPROVING THE
HOMOGENEITY OF MAGNETIC FIELDS
Filed June 13, 1955  2 Sheets-Sheet 1
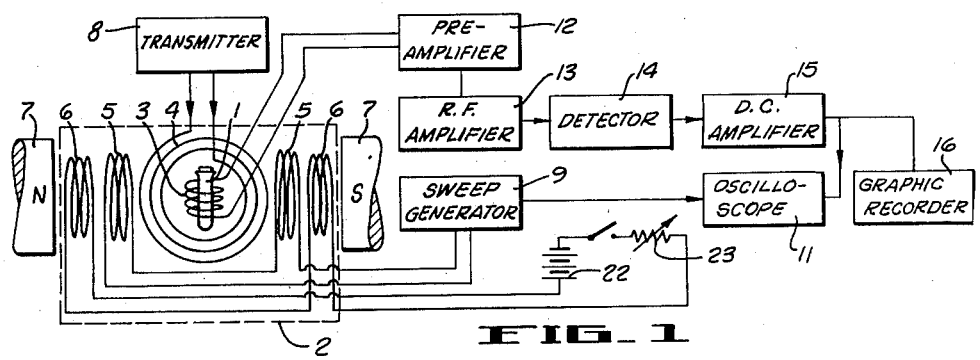
FIG_1
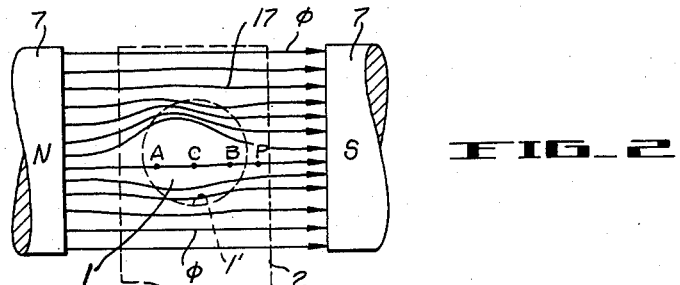
FIG_2
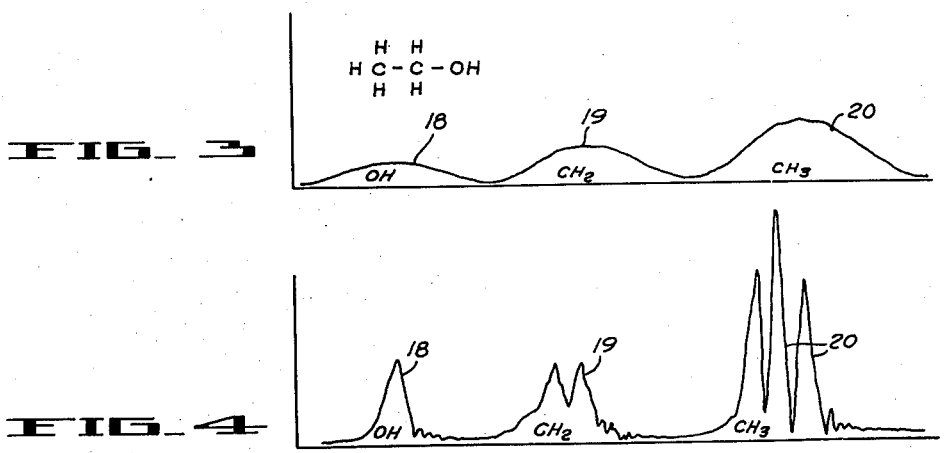
FIG_3
FIG_4
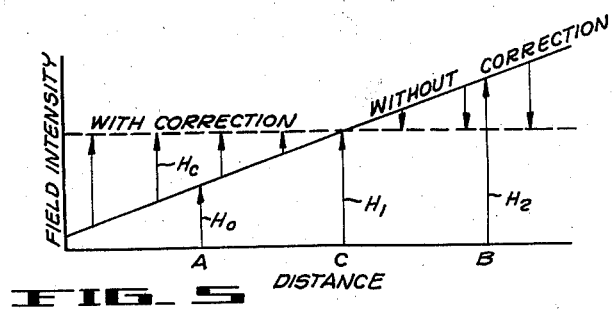
FIG_5
FORREST A. NELSON
INVENTOR.
BY
ATTORNEY Oct. 28, 1958 F. A. NELSON 2,858,504
MEANS AND APPARATUS FOR IMPROVING THE
HOMOGENEITY OF MAGNETIC FIELDS
Filed June 13, 1955 2 Sheets-Sheet 2
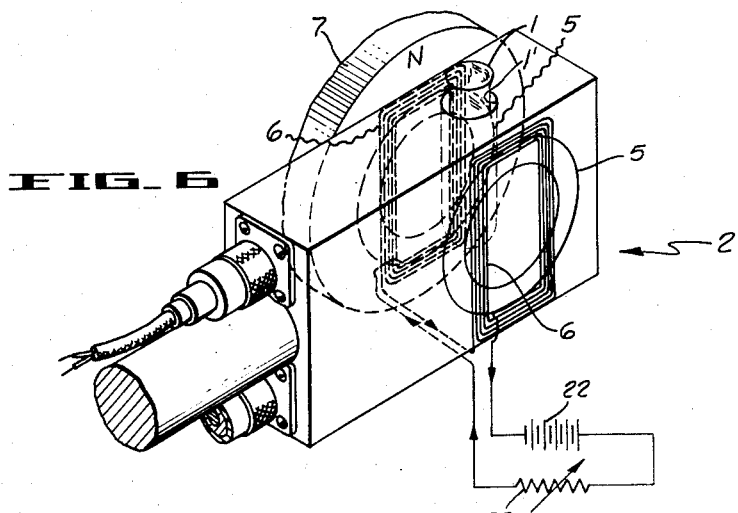
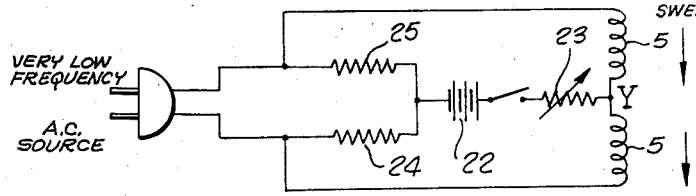
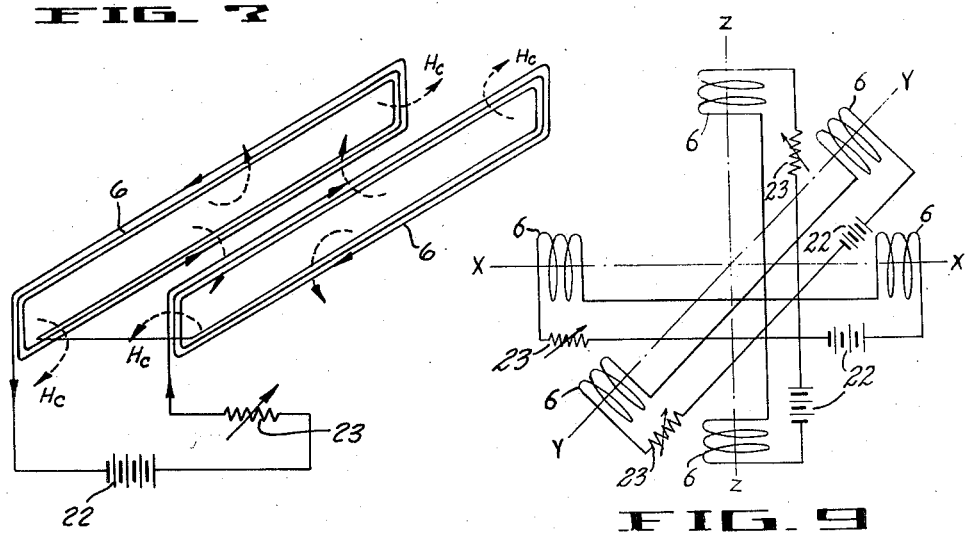
FORREST A. NELSON
INVENTOR.
BY
ATTORNEY United States Patent Office 2,858,504
Patented Oct. 28, 1958

2,858,504

MEANS AND APPARATUS FOR IMPROVING THE HOMOGENEITY OF MAGNETIC FIELDS

Forrest A. Nelson, Palo Alto, Calif., assignor to Varian Associates, San Carlos, Calif., a corporation of California Application June 13, 1955, Serial No. 515,097

18 Claims. (Cl. 324—.5)

This invention relates in general to magnetic field control methods and apparatus and more specifically to methods and apparatus for achieving a homogeneous magnetic field. Homogeneous magnetic fields are extremely useful, for example, in attaining high resolution in the gyromagnetic art.

The present invention involves a novel method and apparatus for varying magnetic fields and may be readily comprehended if explained, for example, as applied to gyromagnetic resonance use. Gyromagnetic resonance is explained in detail in United States Reissue Patent No. 23,950 entitled "Method and Means for Chemical Analysis by Nuclear Inductions" issued to Felix Bloch and William Hansen; "Nuclear Induction" by Felix Bloch in Physical Review, vol. 70, page 460 and also an article entitled "The Nuclear Induction Experiment," written by Bloch, Hansen and Packard appearing in Physical Review, vol. 70, page 474. Very briefly a gyromagnetic resonance analysis comprises the placing of a sample of matter to be investigated within an extremely strong and uniform unidirectional magnetic field. To the sample and at right angles to the polarizing field is applied a radio frequency magnetic field. At precisely the correct combination of these two fields the nuclei of the sample experience a gyromagnetic resonance and emit an electromagnetic signal which is detected and displayed.

From the gyromagnetic resonance signal it is possible to obtain a wealth of information both qualitative as well as quantitative about the chemical and physical nature of the sample investigated. As the art has advanced a need has grown for higher degrees of resolution. In order to obtain high resolution it is important that the sample see a homogeneous magnetic field intensity. In the past numerous devices have been used to obtain uniform magnetic fields. Generally great care is given to the winding of a powerful electromagnet for producing the field, and providing uniform pole pieces and proper alignment of the pole pieces upon the coil structure. Even after this tedious preparation additional homogeneity is often desired.

Accordingly, it is an object of the present invention to provide novel apparatus and methods for improving the homogeneity of a given magnetic field.

One feature of the present invention is the provision of a current carrying conductor positioned such that magnetic fields emanating from said conductor effectively cancel undesirable magnetic field intensity gradients existing within a certain volume of field.

Another feature of the present invention is the provision of novel electrical coil apparatus comprising one or more pairs of coils connected and positioned such that the magnetic fields from a pair of said coils are mutually opposing, the coils being positioned relative to a certain volume of magnetic field such that undesirable field intensity gradients within said certain volume are expeditiously nullified.

Another feature of the present invention is the provision of novel electrical coil apparatus in conjunction with gyromagnetic resonance systems such that by positioning said electrical coil apparatus in certain space relationships relative to the sample under investigation undesirable field gradients may be substantially eliminated thereby greatly enhancing signal resolution.

Another feature of the present novel invention is the adaption of existing electrical coils used in gyromagnetic analysis systems to serve as field corrective coils for substantially decreasing field intensity gradients within the sample volume and greatly improving signal resolution.

Other objects and advantages of this invention will become apparent from the specification, taken in connection with the accompanying drawings wherein the invention is embodied in concrete form.

In the drawings,

Fig. 1 is a block diagram of a high resolution gyromagnetic resonance spectroscopy system in which the present invention may be utilized to greatly increase the signal resolution thereof, Fig. 2 is a diagrammatic view showing a sample of matter positioned in a strong polarizing magnetic field, Fig. 3 shows a high resolution trace of a signal obtained from a sample of ethyl alcohol exposed to a small magnetic field inhomogeneity, Fig. 4 shows a high resolution trace of a signal obtained from a sample of ethyl alcohol within a corrected field, Fig. 5 is a graph of field magnitude vs. distance, Fig. 6 is an isometric view of the probe structure showing a field corrective coil mounted thereon, Fig. 7 is a circuit diagram of a novel embodiment of the present invention, Fig. 8 is a diagrammatic view of the novel flat coil circuit, and Fig. 9 is a schematic diagram depicting a novel spacial quadrature coil arrangement of the present invention.

Referring now to Fig. 1, there is shown in block diagram form a gyromagnetic resonance system suitable for high resolution spectroscopy. The sample 1 to be analyzed is normally placed within or passes through a cavity 1' (see also Fig. 6) provided in a probe 2 of the general type disclosed in application Serial No. 366,156, filed July 6, 1953, which has a receiver or detector coil 3 surrounding the sample, a transmitter coil 4 at right angles to coil 3, a pair of field sweep coils 5 at right angles to both coils 3 and 4. To this is added a pair of novel field corrective coils 6. The probe is positioned in a polarizing magnetic field of about 7000 gauss produced by a strong electromagnet represented by pole pieces 7 on opposite sides of the probe. A transmitter 8 which includes a fixed frequency and highly stable oscillator, and an amplifier provides a suitable source of radio frequency energy to the transmitter coil 4. The transmitter coil 4 produces an alternating magnetic field which is perpendicular to the polarizing magnetic field to thereby cause the nuclei of the sample to precess at the particular operating frequency. A sweep generator 9 supplies a low frequency voltage to field sweep coils 5 which slightly modulate the polarizing field to repeatedly sweep through the region of gyromagnetic resonance of the nuclei involved in the sample. The field sweeping voltage is also fed to the horizontal deflection plates of an oscilloscope 11 to synchronize the oscilloscope with the modulated polarizing field.

The alternating field produced by the precessing nuclei induces a signal voltage in the receiver coil 3 which is transmitted to the preamplifier 12, then to radio frequency amplifier stage 13, and then to a detector circuit 14 where the high frequency signal is demodulated to give an envelope signal. This signal is transmitted to a D. C. and low frequency amplifier 15 where it is amplified and then transmitted to the vertical plates of the oscilloscope 11. A graphic recorder 16 is also shown provided to give a permanent recording in graphic form of the amplitude of the induced energy in the receiver coil 3.

In such high resolution systems even the best polarizing magnetic fields available are slightly inhomogeneous over the volume occupied by the sample. Inhomogeneity may be caused by any number of things, for example, the magnetic pole pieces are very likely to have areas which do not possess uniform magnetic permeability. Furthermore the probe structure itself although made of a nonmagnetic material will, because of its boundaries between different materials and voids, possess areas of non-uniform magnetic permeability thereby steering the magnetic flux lines and resulting in areas of increased and decreased magnetic field strength. To demonstrate this steering effect see Fig. 2 wherein there is depicted a polarizing magnetic field intensity H represented by a plurality of magnetic flux lines 17. Represented by phantom lines is a top view of a probe structure 2 containing therewithin a sample 1. Three arbitrary points of interest A, B and C are selected within the sample volume. A magnetic permeability discontinuity is arbitrarily placed at point P. Under such condition the flux lines $\phi$ take the paths as shown in Fig. 2. Since the field intensity H at any given point within a field is equal to the number of field lines passing through a given area perpendicular to the direction of the flux lines we can see that the scalar magnitude of field intensity in the N—S direction, i. e., from pole piece N to pole piece S, at points A, B and C can be represented by the length of vectors $H_0$, $H_1$ and $H_2$ as shown in Fig. 5. The slope of a line connecting the tops of these vectors would represent the N—S field intensity gradient existing within the sample. For the sake of clearness the intensity gradient has been greatly magnified.

In testing a sample, for example, ethyl alcohol, if a moderate gradient of H exists within the sample a signal having poor resolution would result as shown in Fig. 3 wherein the humps 18, 19 and 20 are due to proton resonances of the OH, $CH_2$ and $CH_3$ groups respectively. Looking now only at the $CH_3$ group, the three hydrogen nuclei or protons should resonate at slightly different values of H with a certain R. F. driving field. However, because of the H gradient existing within the sample, all the hydrogen nuclei bonded in a like manner see their resonant H field value at slightly different times thus accounting for the rounded appearance of the signal produced. For this particular sample to obtain resolution between the three hydrogen nuclei requires a field intensity homogeneity over the sample region to within about one milligauss. With a typical magnetic field intensity of 7000 gauss this represents a homogeneity of one part in seven million which can be achieved by utilization of a precise magnet made with great care. Fig. 4 shows the signal obtained from the same sample in a field possesing the necessary homogeneity.

Field inhomogeneity as was discussed supra may be caused by factors in the probe or in the pole pieces, thus H gradients are quite likely to exist. Eliminating these gradients then becomes of prime importance. For this purpose (Fig. 1) pairs of novel field corrective coils 6 are provided which are supplied with direct electrical current from a battery 22. The amount of current is controllable by a variable resistance 23. In a preferred embodiment of the present invention the coils are wound such that the magnetic field created by each coil is oppositely directed but this condition is not required. A single coil is useful if changes in the average field intensity over the sample may be tolerated or if it is carefully positioned not to change the average field intensity over the sample. Coils wound to produce oppositely directed fields are known in the art as bucking coils. The corrective coils may be positioned in space relation to the center of the sample such that their axial fields cancel at the center point but this is not required, in fact, separate current sources may be connected to each of the coils 6. Referring now to Fig. 5 there is depicted a N—S H gradient. Subtracting from the polarizing field H on the high side and adding to the field intensity on the weak side of centerpoint C is the corrective field $H_C$ such that the gradient is eliminated. The sample now sees a homogeneous field and the nuclei produce a signal of greatly enhanced resolution as seen in Fig. 4.

The above discussion has been confined to a single linear field intensity gradient in the N—S direction; this, of course, is a much simplified case, for an H gradient may well have components in all three directions in three dimensional space. However, the present invention is adaptable to such a case by merely increasing the number of pairs of corrective coils and positioning them in the proper space relationship to the sample. Such a plurality of coil pairs, adapted to correct linear field gradients in three dimensional space, are depicted in Fig. 9.

Experience has shown that a single pair of field corrective coils positioned as depicted in Fig. 6, i. e., in axial alignment with the polarizing field, the coils being positioned symmetrically about the vertical axis of the sample, will substantially improve gyromagnetic resolution. A second embodiment of the present invention is shown in Fig. 7 wherein the field sweep coils 5 have been centertapped at point Y, the centertap forming a terminal for a direct current circuit connected thereto. The direct current circuit comprises a direct current source, battery 22, and variable resistor 23 for controlling the amount of direct current in the circuit. The purpose of the direct current circuit is to provide a direct component of current through both halves of the sweep coil thereby utilizing the existing sweep coil as a pair of bucking field corrective coils while at the same time not interfering with the sweep function of the coil. To prevent interference with the sweep circuit function the direct current circuit must not divert appreciable alternating sweep current. Thus the direct current circuit is isolated from the alternating current by resistors 24 and 25 of such a value, for example, 330 ohms, that to the very low frequency alternating current, for example, 0.1 C. P. S., the relatively low impedance path through the sweep coils looks as a shunt compared to the alternative of transversing the direct current branch through resistors 24 and 25, battery 22 and variable resistor 23. It can readily be seen that many different forms of the direct current circuit could be envisioned; however, the essential feature of such a circuit is the application of a direct current through portions of the sweep coil to produce bucking magnetic fields in the region of field to be corrected.

When a square, rectangular or circular corrective coil is utilized as depicted in Figs. 6 and 7 a field will be created having components at right angles to the primary axial corrective component. Assuming, for example, that a rectangular corrective coil is used, it can be seen then that such a coil will produce, in the sample region, fields at right angles to the four sides of the coil rectangle as well as the primary component in axial alignment with the coil. It can be seen then that if the rectangular coil is elongated such that the ends of the coil are disposed remote from the sample region (Fig. 8), thereby forming a long narrow coil of flat cross section, the aforementioned right angle fields in the sample region due to the ends of the coil will be substantially eliminated. Thus this embodiment achieves a more precise control over corrective fields applied to the sample region.

It must be borne in mind that the disclosure, thus far, has been principally limited to facilitate explanation to the use of a single pair of corrective coils. A plurality of similar corrective coils spaced about the sample at proper angles and distances and following the teachings of the present invention can be utilized to eliminate almost any field intensity gradient within the sample volume.

In operation a most homogeneous section of the magnetic field is selected. (Oftentimes it will be found that one area of the pole pieces is more uniform.) The probe structure containing the sample is then positioned in the selected region of the polarizing magnetic field whereon the system is put into operation and an observable signal obtained upon the oscilloscope, graphic recorder, etc. While observing the signal for resolution the variable resistor controlling the field corrective current is tuned for maximum resolution. If more than one pair of field corrective coils is employed, several adjustments of the various field corrective currents may be necessary to attain maximum resolution.

Since many modifications and variations may be made in the described method and apparatus without departing from the spirit of the invention, the foregoing description is to be considered as exemplary and not in a limiting sense.

What is claimed is:

1. Apparatus of the character described adapted to eliminate certain undesired magnetic field gradients in a magnetic field comprising a pair of mutually spaced apart electrical coils adapted to carry currents and positioned such as to set up magnetic fields for canceling undesired field gradients within the magnetic field to thereby enhance the homogeneity of the field.

2. Apparatus for improving the the homogeneity of a certain volume of magnetic field comprising a pair of spaced apart bucking coils adapted to produce when energized opposing magnetic fields between said coils for canceling undesired gradients in the magnetic field, said coils faced opposed to each other and adapted to be positioned straddling the certain volume of magnetic field.

3. Apparatus for improving the homogeneity of a certain volume of a given magnetic field comprising a spaced apart pair of bucking coils adapted to produce when energized opposing magnetic fields between said coils for canceling undesired gradients in the magnetic field, said coils faced opposed to each other and probe means for holding said coils in a desired position with relation to the certain volume of field.

4. Apparatus for improving the homogeneity of a certain volume of magnetic field comprising a pair of bucking coils series connected and adapted to produce when energized opposing magnetic fields between said coils for canceling undesired gradients in the magnetic field, said coils faced opposed to each other and adapted to be positioned straddling the certain volume of magnetic field.

5. Apparatus for improving the homogeneity of a certain volume of magnetic field comprising a pair of spaced apart bucking coils adapted to produce opposing magnetic fields when energized for canceling undesired gradients in the magnetic field and having long and short sides, said coils series connected and faced opposed, said coils having the opposing short sides of each coil disposed remote from its center thereby substantially eliminating undesirable field gradients from said short sides.

6. Apparatus for improving the homogeneity of a certain volume of magnetic field comprising a centertapped magnetic sweep coil for sweeping the magnetic field and further serving when energized to produce opposing magnetic fields in both halves of said coil for canceling undesired gradients in the magnetic field whereby the homogeneity of the magnetic field may be greatly enchanced, and probe means for holding said sweep coil in the desired position relative to the certain volume of magnetic field.

7. Apparatus for improving the homogeneity of a certain volume of magnetic field comprising a centertapped magnetic sweep coil, a direct current circuit utilizing said centertap as one terminal and having both halves of said sweep coil bucking connected to produce when energized opposing magnetic fields therebetween for canceling undesired gradients in the magnetic field and thereby improving the homogeneity of the volume of magnetic field, and probe means for holding said sweep coil in space relation to the certain volume of field.

8. Apparatus for improving the homogeneity of a given volume of magnetic field comprising a direct current carrying conductor disposed adjacent the volume of field, means for selectively controlling the amount of direct current through said conductor such that the magnetic field surrounding said conductor may be made to superimpose upon the existing field and correct for certain field inhomogeneities within said certain volume of magnetic field, and means for detecting the homogeneity of the certain volume of field whereby control of the current through said conductor may be effectively correlated with the detected homogeneity of the volume of magnetic field.

9. Apparatus for improving the homogeneity of a certain volume of magnetic field comprising an electrical conducting coil disposed adjacent said volume of field, a variable direct current source supplying said coil such that when said coil is energized the magnetic field emanating therefrom is superimposed upon the existing field to correct certain field inhomogeneities, and means for detecting the homogeneity of the certain volume of field for correlating the required current through the coil with the detected field homogeneity.

10. Apparatus for improving the homogeneity of a certain volume of magnetic field comprising a pair of bucking coils adapted to produce opposing magnetic fields therebetween for cancelling undesired gradients in the magnetic field, said coils spaced apart and mutually opposed to each other, said coils disposed straddling said certain volume of magnetic field, variable direct current source means supplying said coils, and means for detecting the homogeneity of the certain volume of field for correlating the current through said coils with the detected field homogeneity.

11. Apparatus for improving the homogeneity of a certain volume of magnetic field comprising a pair of bucking coils adapted to produce opposing magnetic fields therebetween for cancelling undesired gradients in the magnetic field, said coils mutually opposed to each other and each substantially equidistant from the certain volume of field, variable current source means supplying said coils, and field homogeneity detecting means associated with the certain volume of field for detecting maximum field homogeneity.

12. Apparatus for improving the homogeneity of a certain volume of magnetic field comprising in combination a pair of bucking coils adapted to produce opposing magnetic fields therebetween for canceling undesired gradients in the magnetic field, said coils series connected spaced apart and mutually opposed, said coils positioned straddling said certain volume of magnetic field, variable current source means supplying said coils, and magnetic field homogeneity detecting means for detecting the homogeneity of the certain volume of field.

13. Apparatus for improving the homogeneity of a certain volume of magnetic field comprising a pair of bucking coils adapted to produce opposing magnetic fields therebetween for canceling undesired gradients in the magnetic field, said coils positioned diametrically opposed, said coils having a relatively flat cross-section, opposing short sides of said flat coils being disposed remote from the center of said coils, said coils disposed straddling said certain volume of magnetic field, variable current source means supplying said coils, and field homogeneity detecting means disposed within the certain volume of field for determining maximum field homogeneity.

14. Apparatus for improving the homogeneity of a certain volume of magnetic field comprising in combination means for producing a strong polarizing magnetic field, means for positioning in said polarizing field a sample of matter, a pair of bucking coils adapted to produce when energized opposing magnetic fields therebetween for canceling undesired gradients in the magnetic field, said coils series connected spaced apart and mutually opposed, said coils having a relatively flat cross section, opposite short sides of each coil being disposed remote from its center, said coils disposed straddling the sample of matter and carried upon said means for positioning the sample of matter in the polarizing field, variable direct current source means supplying said coils, and field homogeneity detector means for determining the homogeneity of the magnetic field seen by said sample of matter.

15. Apparatus for improving the homogeneity of a certain volume of magnetic field comprising in combination means for producing a strong polarizing magnetic field, sweep coil means for sweeping the magnetic field, said sweep coils having a centertap and adapted when energized via said center tap to produce opposing magnetic fields between halves of said sweep coil means for canceling undesired gradients in the magnetic field, variable direct current source means supplying said centertap, and resistance means isolating said sweep coil circuit from said direct current circuit thereby allowing the sweep current to be independent of the field inhomogeneity corrective current.

16. Apparatus for improving the homogeneity, of a certain volume of magnetic field comprising a centertapped magnetic sweep coil thereby adapting the sweep coils when properly energized to produce opposing magnetic fields between halves of the sweep coils for cancelling undesired gradients in the magnetic field, variable direct current source means supplying said centertap, a direct current circuit having both halves of said sweep coil parallel connected, alternating current source means supplying said sweep coils for sweeping the total magnetic field, impedance means isolating said direct current circuit from said alternating sweep current circuit, and probe means holding said sweep coil in space relation to the certain volume of field.

17. Apparatus for improving the homogeneity of a certain volume of magnetic field comprising a center-tapped sweep coil circuit means for sweeping the magnetic field, variable direct current means supplying said centertap, a direct current circuit having both halves of said sweep coil bucking connected for producing opposing magnetic fields between halves of said sweep coils for canceling undesired gradients in the magnetic field, impedance means isolating said sweep coil circuit from said direct current circuit thereby allowing the sweep current to be independent of the variable direct current, probe means holding said sweep coil in space relation to the certain volume of magnetic field, a second pair of bucking coils disposed straddling the certain volume of magnetic field and positioned in space quadrature with said sweep coil, variable direct current source means supplying said second bucking coils, and magnetic field homogeneity detector means associated with the certain volume of magnetic field for determining the desired direct current values.

18. Apparatus for improving the homogeneity of a certain volume of magnetic field comprising a first pair of spaced apart bucking coils, said first pair of coils faced opposed to each other and adapted to be positioned straddling the certain volume of magnetic field, a second pair of spaced apart bucking coils, said second pair of coils faced opposed to each other and adapted to be positioned straddling the certain volume of magnetic field and said second coils adapted when energized to produce a magnetic field substantially at right angles to the magnetic field produced by said first pair of bucking coils, a third pair of spaced apart bucking coils, said third pair of coils faced opposed to each other and adapted to be positioned straddling the certain volume of magnetic field, said third coils adapted to produce when energized a magnetic field at right angles to said first and said second magnetic fields produced by said first and said second pairs of bucking coils, and said first, said second and said third pairs of bucking coils adapted to produce when energized opposing magnetic fields between coils comprising each pair whereby undesired linear magnetic field gradients having components in any one of the three directions in three directional space may be effectively canceled by the proper energization of said first, said second and said third pairs of coils.

References Cited in the file of this patent

UNITED STATES PATENTS

| | | |
|---|---|---|
| 2,589,494 | Hershberger | Mar. 18, 1952 |
| 2,700,147 | Tucker | Jan. 18, 1955 |
| 2,714,714 | Anderson et al. | Aug. 2, 1955 |
| 2,718,629 | Anderson et al. | Sept. 20, 1955 |

OTHER REFERENCES

Publication, by Varian Associates, "Nuclear Resonance," dated March 1952, 4 pp.